United States Patent
Biris et al.

(10) Patent No.: US 9,068,283 B2
(45) Date of Patent: Jun. 30, 2015

(54) STRAIN SENSORS, METHODS OF MAKING SAME, AND APPLICATIONS OF SAME

(71) Applicant: Board of Trustees of the University of Arkansas, Little Rock, AR (US)

(72) Inventors: Alexandru S. Biris, Little Rock, AR (US); Steven Trigwell, Kennedy Space Center, FL (US); Walter Hatfield, Merritt Island, FL (US)

(73) Assignee: BOARD OF TRUSTEES OF THE UNIVERSITY OF ARKANSAS, Little Rock, AR (US)

( * ) Notice: Subject to any disclaimer, the term of this patent is extended or adjusted under 35 U.S.C. 154(b) by 0 days.

(21) Appl. No.: 13/662,955

(22) Filed: Oct. 29, 2012

(65) Prior Publication Data

US 2013/0104665 A1 May 2, 2013

Related U.S. Application Data

(60) Provisional application No. 61/552,849, filed on Oct. 28, 2011.

(51) Int. Cl.
*D01F 9/127* (2006.01)
*B82Y 30/00* (2011.01)
(Continued)

(52) U.S. Cl.
CPC .............. *D01F 9/127* (2013.01); *Y10T 428/25* (2015.01); *Y10T 428/30* (2015.01); *B82Y 30/00* (2013.01); *B82Y 40/00* (2013.01); *G01B 7/18* (2013.01); *H01B 1/04* (2013.01)

(58) Field of Classification Search
CPC ............ G01B 7/20; G01B 7/18; D01F 9/127; H01B 1/04; B82Y 30/00; B82Y 40/00; Y10T 428/25; Y10T 428/30

USPC ......................................... 73/774; 374/45, 46
See application file for complete search history.

(56) References Cited

U.S. PATENT DOCUMENTS

2004/0228961 A1* 11/2004 Smits et al. ................... 427/2.13
2006/0010996 A1* 1/2006 Jordan et al. ..................... 73/774
(Continued)

OTHER PUBLICATIONS

T. DeLay, "Hybrid composite cryogenic tank structure", NASA Tech Briefs, Jan. 2011. Available: http://www.techbriefs.com/component/content/article/9006.
(Continued)

*Primary Examiner* — Lisa Caputo
*Assistant Examiner* — Philip Cotey
(74) *Attorney, Agent, or Firm* — Morris, Manning & Martin, LLP; Tim Tingkang Xia, Esq.

(57) ABSTRACT

In one aspect, the present invention relates to a layered structure usable in a strain sensor. In one embodiment, the layered structure has a substrate with a first surface and an opposite, second surface defining a body portion therebetween; and a film of carbon nanotubes deposited on the first surface of the substrate, wherein the film of carbon nanotubes is conductive and characterized with an electrical resistance. In one embodiment, the carbon nanotubes are aligned in a preferential direction. In one embodiment, the carbon nanotubes are formed in a yarn such that any mechanical stress increases their electrical response. In one embodiment, the carbon nanotubes are incorporated into a polymeric scaffold that is attached to the surface of the substrate. In one embodiment, the surfaces of the carbon nanotubes are functionalized such that its electrical conductivity is increased.

22 Claims, 10 Drawing Sheets

(51) Int. Cl.
  *G01B 7/16* (2006.01)
  *H01B 1/04* (2006.01)
  *B82Y 40/00* (2011.01)

(56) References Cited

U.S. PATENT DOCUMENTS

| | | | |
|---|---|---|---|
| 2006/0283262 A1* | 12/2006 | Smits et al. | 73/799 |
| 2007/0138010 A1* | 6/2007 | Ajayan | 427/112 |
| 2007/0222472 A1* | 9/2007 | Raravikar et al. | 324/765 |
| 2008/0314149 A1* | 12/2008 | Rueger | 73/579 |
| 2009/0136413 A1* | 5/2009 | Li et al. | 977/742 |
| 2009/0269560 A1* | 10/2009 | Dhinojwala et al. | 977/742 |
| 2010/0187484 A1* | 7/2010 | Worsley et al. | 977/742 |
| 2011/0031566 A1* | 2/2011 | Kim et al. | 428/457 |
| 2011/0049579 A1* | 3/2011 | Dumitru et al. | 977/762 |
| 2011/0051775 A1* | 3/2011 | Ivanov et al. | 73/723 |
| 2011/0133095 A1* | 6/2011 | Imai | 257/43 |
| 2011/0169704 A1* | 7/2011 | Ajayan et al. | 343/700 |
| 2011/0171419 A1* | 7/2011 | Li et al. | 428/113 |
| 2011/0184657 A1* | 7/2011 | Chou | 977/742 |
| 2011/0203390 A1* | 8/2011 | Tao et al. | 73/862.046 |
| 2011/0226066 A1* | 9/2011 | Anand et al. | 73/777 |
| 2011/0250427 A1* | 10/2011 | Kotov et al. | 428/457 |
| 2012/0000293 A1* | 1/2012 | Baughman et al. | 73/861.08 |
| 2012/0025165 A1* | 2/2012 | Armitage et al. | 977/762 |

OTHER PUBLICATIONS

K. Ryan, J. Cronin, S. Arzberger, K. Mallick, and N. Munshi, "Prediction of pressure cycle induced microcrack damage in linerless composite tanks", Proc. AIAA/ASME/ASCE/AMS/ASC Structures, Structural Dynamics, and Materials Conf., Newport RI, 2006. AIAA2006-2201.

Final report of the X-33 liquid hydrogen tank test investigation team, Marshall Space Flight Center, Huntsville, AL, May 2000.

Investigation of the cryogenic composite tank rupture type D/Close call mishap report, NASA IRIS Incident No. S-2008-359-00002, Feb. 20, 2009. Available: http://kscsafety.kscnasa.gov/KSCSafetyMishaps.htm.

C. Li and T. W. Chou, "Atomistic modeling of carbon nanotube-based mechanical sensors", J. Intelligent Material Systems and Structures, vol. 17, No. 3, pp. 247-254, 2006.

H. G. Craighead, "Nanoelectromechanical systems", Science, vol. 290, No. 5496, pp. 1532-1535, 2000.

A. Kis and A. Zettl, "Nanomechanics of carbon nanotubes" Phil. Trans. R. Soc. A 13, vol. 366, No. 1870, pp. 1591-1611, 2008.

E. Dervishi, Z. Li, Y. Xu, V. Saini, A. R. Biris, D. Lupu, and A. S. Biris, "Carbon nanotubes: Synthesis, properties, and applications", Particulate Science and Technology, vol. 27, pp. 107-125, 2009.

Y. Zhu and H. D. Espinosa, "An electromechanical material testing system for in situ electron microscopy and applications", PNAS, 2005, vol. 102, pp. 14503-14508, 2005.

K.J. Loh, J. P. Lynch, and N. A. Kotov, "Conformable single-walled carbon nanotube thin film strain sensors for structural monitoring", Proc. 5th International workshop on structural health monitoring, Stanford, CA, Sep. 2005.

I. Kang, M. J. Schulz, J. H. Kim, V. Shanov, and D. Shi, "A carbon nanotube strain sensor for structural health monitoring", Smart Materials and Structures, vol. 15, pp. 737-748, 2006.

M. Park, H. Kim, and J. Youngblood, "Strain-dependant electrical resistance of multi-walled carbon nanotube/polymer composite films", Nanotechnology, vol. 19, 055705 (7pp) 2008.

X. Li, C. Levy, and L. Elaadil, "Multiwalled carbon nanotube film for for strain sensing", Nanotechnology, vol. 19, 045501 (7pp) 2008.

S. M. Vemura, R. Wahi, S. Nagarajaiah, and P. M. Ajayan, "Strain sensing using a multiwalled carbon nanotube film", J. Strain Analysis, vol. 44, pp. 555-562, 2009.

N. Koratkar, A. Modi, E. Lass, and P. Ajayan, "Temperature effects on resistance of aligned multiwalled carbon nanotube films", J. Nanosci. Nanotechnol., vol. 4, No. 7, pp. 744-748, 2004.

W. Wang, P. Ciselli, E. Kuznetsov, T. Peijs, and A. H. Barber, "Effective reinforcement in carbon nanotube-polymer composites", Phil. Trans. R. Soc. A 13, vol. No. 366, 1870, pp. 1613-1626, 2008.

L. Tong, X. Sun, and P. Tan, "Effect of long multi-walled carbon nanotubes on delamination toughness of laminated composites", J. Composite Materials, vol. 42, No. 1, pp. 5-23, 2008.

B. Sulong, J. Park, N. Lee, and J. Goak, "Wear behavior of functionalized multi-walled carbon nanotube reinforced epoxy matrix composites", J. Composite Materials, vol. 40, No. 21, pp. 1947-1960, 2006.

Y. C. Zhang and X. Wang, "Hygrothermal effects on interfacial stress transfer characteristics of carbon nanotubes-reinforced composites system", J. Reinforced Plastics and Composites, vol. 25, No. 1, pp. 71-88, 2006.

R. L. Jacobsen, T. M. Tritt, J. R. Guth, A. C. Ehrlich, and D. J. Gillespie, "Mechanical properties of vapor-grown carbon fiber", Carbon, vol. 33, No. 9, pp. 1217-1221, 1995.

M. M. J. Treacy, T. W. Ebbesen, and J. M. Gibson "Exceptionally high Young's modulus observed for individual carbon nanotubes", Nature vol. 381, pp. 678-680, 1996.

E. W. Wong, P. E. Sheehan, and C. M. Lieber, "Nanobeam mechanics: elasticity, strength, and toughness of nanorods and nanotubes", Science, vol. 277, No. 5334, pp. 1971-1975, 1997.

M-F. Yu, O. Lourie, M. J. Dyer, K. Moloni, T. F. Kelly, and R. S. Ruoff, "Strength and breaking mechanism of multiwalled carbon nanotubes under tensile load", Science, vol. 287, No. 5453, pp. 637-640, 2000.

P. Poncharal, Z. L. Wang, D. Ugarte and W. A. de Heer, "Electrostatic deflections and electromechanical resonances of carbon nanotubes" Science, vol. 283, No. 5407, pp. 1513-1516, 1999.

E. Dervishi, Z. Li, A. R. Biris, D. Lupu, S. Trigwell and A. S. Bids, "Morphology of multi-walled carbon nanotubes affected by the thermal stability of the catalyst system", Chem. Mater. vol. 19, pp. 179-184, 2007.

Z. Li, H. R. Kandel, E. Dervishi, V. Saini, Y. Xu, A. R. Biris, D. Lupu, G. J. Salamo, and A. S. Biris, "Comparative study on different carbon nanotube materials in terms of transparent conductive coatings", Langmuir, vol. 24, No. 6, pp. 2655-2662, 2008.

R. Jin, Z. X. Zhou, D. Mandrus, I. N. Ivanov, G. Eres, J. Y. Howe, A. A. Puretzky, and D. B. Geohegan, "The effect of annealing on the electrical and thermal transport properties of macroscopic bundles of long multi-wall carbon nanotubes" Physica ,B, vol. 388, pp. 326-330, 2007.

S. I. Jung, S. H. Jo, H. S. Moon, J. M. Kim, D. S. Zang, and C. J. Lee, "Improved crystallinity of double-walled carbon nanotubes after a high-temperature thermal annealing and their enhanced field emission properties", J. Phys. Chem. C, vol. 111, pp. 4175-4179, 2007.

E. Dervishi, Z. Li, V. Saini, R. Sharma, Y. Xu, M. K. Mazumder, A. S. Biris, S. Trigwell, A. R. Biris, D. Saini, and D. Lupu, "Multifunctional coatings with carbon nanotubes for electrostatic charge mitigation and with controllable surface properties", IEEE Trans. Ind. Apps., vol. 45, No. 5, pp. 1547-1552, 2009.

M. Meyyappan, Carbon Nanotubes: Science and Applications. Boca Raton, Fla.: CRC, 2005.

Z. Li, A. S. Biris, E. Dervishi, V. Saini, Y. Xu, A. R. Biris and D. Lupu, "Influence of impurities on the x-ray photoelectron spectroscopy and Raman spectra of single-wall carbon nanotubes", J. Chem. Phys., vol. 127, 154713, 2007 (7 pages).

L.E. McNeil, H. Park, J.P. Lu and M.J. Peters, "Effect of residual catalyst on the vibrational modes of single-walled carbon nanotubes," J. Appl. Phys. vol. 96, pp. 5158-5162, 2004.

G. S. B. McKee and K. S. Vecchio, "Thermogravimetric analysis of synthesis variation effects on CVD generated multiwalled carbon nanotubes", J. Phys. Chem. B, vol. 110, No. 3, pp. 1179-1186, 2006.

M. S. Dresselhaus and P. C. Eklund, "Phonons in carbon nanotubes", Advances in Physics, vol. 49, No. 6, pp. 705-814, 2000.

E.F. Antunes, A. O. Lobo, E. J. Corat, V. J. Trava-Airoldi, A. A. Martin, and C. Veríssimo, "Comparative study of first-and second order Raman spectra of MWCNT at visible and infrared laser excitation", Carbon, vol. 44, pp. 2202-2211, 2006.

(56) References Cited

OTHER PUBLICATIONS

M. S. Dresselhaus, G. Dresselhaus, R. Saito, and A. Jorio, "Raman spectroscopy of carbon nanotubes" Physics Reports, vol. 409, pp. 47-99, 2005.

K. Mallick, J. Cronin, K. Ryan, S. Arzberger, and N. Munshi, "An integrated systematic approach to linerless composite tank development", Proc. 46th AIAA/ASME/ASCE/AMS/ASC Structure, Structural Dynamics and Materials Conference, Austin, TX, 2005. AIAA 2005-2009.

Dervishi, E. et al., Thermally controlled synthesis of single-wall carbon nanotubes with selective diameters, J. Mat. Chem., 2009, 19, 3004-3012.

Biris, A. R. et al., High-Quality Double-Walled carbon nanotubes grown by a cold-walled radio frequency chemical vapor deposition process, Chem. Mater., 2008, 20, 3466-3472.

Li, Z. et al., Does the wall number of carbon nanotubes matter as conductive transparent material? App. Phys. Lett., 2007, 91, 5.

\* cited by examiner

STRAIN SENSORS, METHODS OF MAKING SAME, AND APPLICATIONS OF SAME

CROSS-REFERENCE TO RELATED PATENT APPLICATION

This application claims priority to and the benefit of, pursuant to 35 U.S.C. §119(e), U.S. provisional patent application Ser. No. 61/552,849, filed Oct. 28, 2011, entitled "STRAIN SENSORS WITH CARBON NANOTUBE COATINGS, METHODS OF MAKING SAME, AND APPLICATIONS OF SAME", by Alexandru S. Biris et al., which is incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [31] represents the 31st reference cited in the reference list, namely, A. R. Biris, D. Lupu, A. Grüneis, P. Ayala, M. H. Rümmel, T. Pichler, Z. Li, I. Misan, E. Dervishi, Y. Xu, and A. S. Biris, "High quality double wall carbon nanotubes grown by a cold-walled radio frequency chemical vapor deposition process", Chemistry of Materials, Vol. 20(10), pp. 3466-3472, 2008.

STATEMENT AS TO RIGHTS UNDER FEDERALLY-SPONSORED RESEARCH

This invention was made with government support under Grant No. DE-FG36-06GO86072 awarded by the U.S. Department of Energy and Grant No. NSF/EPS-1003970 awarded by the U.S. National Science Foundation and under contract NAS10-03006 awarded by NASA. The government has certain rights in the invention.

FIELD OF THE INVENTION

The present invention relates generally to strain sensors, more particularly to strain sensors having a film of nanostructures, methods of making same and applications of same.

BACKGROUND OF THE INVENTION

After the retirement of the space shuttle fleet, the next generation of reusable launch vehicles (RLV) will require new and innovative materials for weight and cost savings. One of the major components of an RLV is the cryogenic tanks for propellant storage. The development of new lightweight tanks has been researched for several years, with lightweight carbon fiber composites being the major focus [1, 2]. However, during development of composite cryogenic tanks, there have been a couple of incidents involving dramatic tank failure during testing [3, 4]. Notice of impending failure would have prevented the cost in injuries and damage to facilities. Current structural monitoring technologies typically use metal foil strain gauges but which have significant limitations such as measuring strain in designated directions and locations, and are susceptible to drifting due to temperature sensitivity. Also, traditional strain gages have an extremely high failure rate and therefore are not well suited for long term use to determine the "health" of a composite structure. Furthermore, many structures such as airframes and cryogenic tanks do not allow access to place or change strain gages if failed.

Ever since their discovery, carbon nanotubes (CNTs) have been researched extensively due to their exceptional electrical and mechanical properties as potential candidates for many applications such as nano-sensors, nanoelectromechanical devices, switches, carbon nanotube-based oscillators and many more [5-9].

The use of CNT films for strain sensors for structural health monitoring has been proposed and tested [10-14] with excellent results, however in these cases, no specific applications were addressed. Development of an embedded strain sensor in a composite structure for use in future transportation vehicles will allow static and dynamic responses without compromising the host structure was reported by Park et al. [12]. One concern has been that CNT films are sensitive to temperature that may introduce errors in a widely varying temperature environment. Results from Vemura et al. [14] showed multi-wall CNT (MWCNT) films exhibited a decrease in resistivity with increasing temperature, but it was stable and predictable, varying by only 0.0217 ohm for a temperature change of 21.1° C. to 35° C. Similarly, Koratkar et al. [15] observed a small decrease in resistance with increasing temperature of a vertically aligned MWCNT film investigated in the temperature range −150° C. to 300° C.

Additionally, carbon nanotubes and especially multi-wall carbon nanotubes (MWCNTs) were incorporated into different types of polymers creating new nano-composite materials with enhanced mechanical and electrical properties [16, 17]. It is important to mention that the parameters such as nanotube crystallinity, length, concentration, interaction between the nanotubes, and the polymer matrix strongly affect the mechanical properties of these new CNT-reinforced polymer composites [18, 19]. Carbon nanotubes synthesized by chemical vapor deposition were found to be very tough and strong and have an extremely high Young's moduli (in the TPa range) by several groups around the world [20, 21]. Wong et al used an atomic force microscope to determine the mechanical properties of isolated MWCNTs [22]. Through a series of continued bending movements, the Young's modulus of the CNTs was measured to be about 1.28 TPa, independent of the nanotube diameter [22].

To characterize a series of individual MWCNTs, Yu et al performed a tensile-loading experiment within a scanning electron microscope, where the highest tensile strength and the Young's modulus of the outer most tube of a MWCNT were found to be 63 GPa and 950 GPa respectively [23]. Furthermore, the static and dynamic mechanical deflections of MWCNTs performed in a transmission electron microscope, established that the elastic bending modulus was found to decrease from 1 to 0.1 TPa as the diameter of the nanotubes increased from 8 to 40 nm [24].

Therefore, a heretofore unaddressed need exists in the art to address the aforementioned deficiencies and inadequacies.

SUMMARY OF THE INVENTION

As discussed above, the next generation of cryogenic fuel tanks, crew habitats, and other components for future spacecrafts, will focus on the use of lightweight carbon fiber composite materials. A critical issue in the design and optimization of such tanks and structures will be in structural health monitoring, however, current strain sensors have limitations.

The invention provides, among other things, solutions of sensing changes in an environment surrounding a subject of interest.

In one aspect, the present invention relates to a layered structure usable in a strain sensor. In one embodiment, the layered structure includes a substrate with a first surface and an opposite, second surface defining a body portion therebetween, and a film of carbon nanotubes deposited on the first surface of the substrate, wherein the film of carbon nanotubes is electrically conductive and characterized with an electrical resistance. In one embodiment, the carbon nanotubes comprise multi-wall carbon nanotubes. In one embodiment, the electrical resistance is a linear function of the stress applied to the film of multi-wall carbon nanotubes.

In one embodiment, the carbon nanotubes are aligned in a preferential direction. In one embodiment, the carbon nanotubes are formed in a yarn such that any mechanical stress increases their electrical response.

In one embodiment, the carbon nanotubes are incorporated into a polymeric scaffold that is attached to the surface of the substrate.

In one embodiment, the surfaces of the carbon nanotubes are functionalized such that its electrical conductivity is increased.

In one embodiment, the layered structure further includes a flexible polymeric film placed between the carbon nanotubes and the substrate, wherein the mechanical properties of the flexible polymeric film match that of the substrate.

In another aspect, the present invention relates to a method of fabricating a layered structure usable in a strain sensor. In one embodiment, the method includes providing a substrate having a first surface and an opposite, second surface defining a body portion therebetween, and depositing a film of carbon nanotubes on the first surface of the substrate, where the film of carbon nanotubes is electrically conductive and characterized with an electrical resistance.

In one embodiment, the deposition of the film of carbon nanotubes includes functionalizing the plurality of multi-wall carbon nanotubes with desired functional groups or mixing the plurality of multi-wall carbon nanotubes with desired surfactants to form a homogenous aqueous suspension, and depositing the homogenous aqueous suspension on the first surface of the substrate.

In one embodiment, the film of carbon nanotubes is formed by painting, spraying, printing, growing, or a combination of them.

In yet another aspect, the present invention relates to a strain sensor. In one embodiment, the strain sensor has a substrate with a first surface and an opposite, second surface defining a body portion therebetween, and a film of carbon nanotubes deposited on the first surface of the substrate, wherein the film of carbon nanotubes is electrically conductive and characterized with an electrical resistance that is changeable in response to a change in an environment surrounding the film of carbon nanotubes. The change in the environment surrounding the film of carbon nanotubes comprises a change in a stress applied to the film of carbon nanotubes, a change in a temperature at the film of carbon nanotubes, or a change in a pressure applied to the film of carbon nanotubes.

The strain sensor may further have a first electrically conducting terminal positioned in a first place of the film of carbon nanotubes, and a second electrically conducting terminal positioned in a second place of the film of carbon nanotubes, wherein the first and second electrically conducting terminals are positioned apart such that in use, an electrically conductive path is formed therebetween to detect changes in the electrical resistance of the film of carbon nanotubes in response to the change in the environment surrounding the film of carbon nanotubes.

In one embodiment, the carbon nanotubes are aligned in a preferential direction. In one embodiment, the carbon nanotubes are formed in a yarn such that any mechanical stress increases their electrical response.

In one embodiment, the carbon nanotubes are incorporated into a polymeric scaffold that is attached to the surface of the substrate.

In one embodiment, the surfaces of the carbon nanotubes are functionalized such that its electrical conductivity is increased.

In one embodiment, the layered structure further includes a flexible polymeric film placed between the carbon nanotubes and the substrate, wherein the mechanical properties of the flexible polymeric film match that of the substrate.

In a further aspect, the present invention relates to a strain sensor. In one embodiment, the strain sensor has a substrate with a first surface and an opposite, second surface defining a body portion therebetween, and a film of nanostructures formed on the first surface of the substrate, wherein the film of nanostructures is electrically conductive and characterized with one or more desired characteristic properties that are changeable in response to a change in an environment surrounding the film of nanostructures. The change in the environment surrounding the film of nanostructures comprises a change in a stress applied to the film of nanostructures, a change in a temperature at the film of nanostructures, or a change in a pressure applied to the film of nanostructures.

In one embodiment, the one or more desired characteristic properties comprise an electrical resistance, wherein the electrical resistance is a linear function of a stress applied to the film of nanostructures.

In one embodiment, the nanostructures are aligned in a preferential direction.

In one embodiment, the nanostructures are formed in a yarn such that any mechanical stress increases their electrical response.

In one embodiment, the nanostructures are incorporated into a polymeric scaffold that is attached to the surface of the substrate.

In one embodiment, the surfaces of the nanostructures are functionalized such that its electrical conductivity is increased.

In one embodiment, the layered structure further includes a flexible polymeric film placed between the nanostructures and the substrate, wherein the mechanical properties of the flexible polymeric film match that of the substrate.

In one embodiment, the nanostructures comprise nanoparticles, nanocomposites, nanofilms, nanoshells, nanofibers, nanorings, nanorods, nanowires, nanotubes, nanocapillaries, or a combination of them. The nanostructures comprise single walled carbon nanotubes, double walled carbon nanotubes, multi-wall carbon nanotubes, graphemes or graphitic nano materials, or a combination of them.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DETAILED DESCRIPTION OF THE INVENTION

Figure 1:
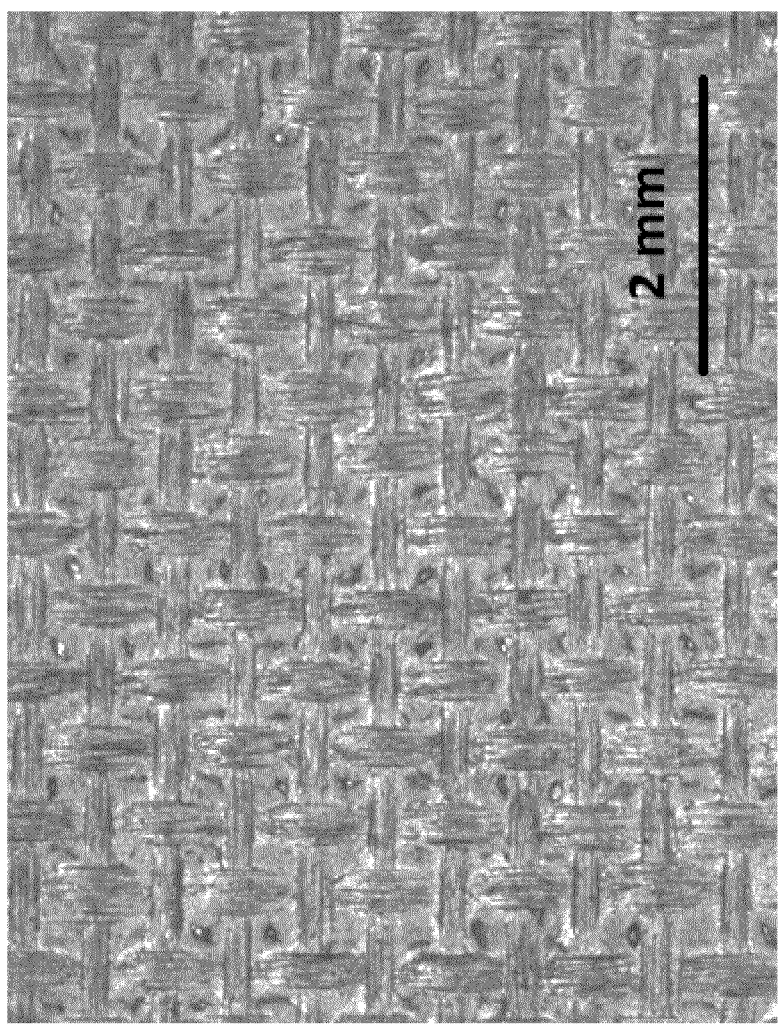
FIG. 1 illustrates optical photograph of the uncoated carbon fiber coupon surface showing the topography of the construction.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention. Additionally, some terms used in this specification are more specifically defined below.

DEFINITIONS

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, if any, the term "scanning electron microscope" or its abbreviation "SEM" refers to a type of electron microscope that images the sample surface by scanning it with a high-energy beam of electrons in a raster scan pattern. The electrons interact with the atoms that make up the sample producing signals that contain information about the sample's surface topography, composition and other properties such as electrical conductivity.

As used herein, if any, the term "transmission electron microscopy" or its abbreviation "TEM" refers to a microscopy technique whereby a beam of electrons is transmitted through an ultra thin specimen, interacting with the specimen as it passes through. An image is formed from the interaction of the electrons transmitted through the specimen; the image is magnified and focused onto an imaging device, such as a fluorescent screen, on a layer of photographic film, or to be detected by a sensor such as a CCD camera.

As used herein, if any, the term "scanning transmission electron microscope" or its abbreviation "STEM" refers to a type of TEM. STEM is distinguished from conventional TEM by focusing the electron beam into a narrow spot which is scanned over the sample in a raster.

As used herein, if any, the term "X-ray photoelectron spectroscopy" or its abbreviation "XPS" refers to a quantitative spectroscopic technique that measures the elemental composition, empirical formula, chemical state and electronic state of the elements that exist within a material. XPS spectra are obtained by irradiating a material with a beam of X-rays while simultaneously measuring the kinetic energy and number of electrons that escape from the top 1 to 10 nm of the material being analyzed. XPS requires ultra-high vacuum (UHV) conditions. XPS is a surface chemical analysis technique that can be used to analyze the surface chemistry of a material in its "as received" state, or after some treatment, for example: fracturing, cutting or scraping in air or UHV to expose the bulk chemistry, ion beam etching to clean off some of the surface contamination, exposure to heat to study the changes due to heating, exposure to reactive gases or solutions, exposure to ion beam implant, exposure to ultraviolet light.

The term "Raman spectrum", as used herein, refers to a spectrum obtained using the spectroscopic technique of Raman spectroscopy to study vibrational, rotational, and other low-frequency modes in a system. Raman spectroscopy relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. The shift in energy gives information about the vibrational modes in the system.

As used herein, the term "thermogravimetric analysis" or its abbreviation "TGA" refers to a type of testing performed on samples that determines changes in weight in relation to a temperature program in a controlled atmosphere. Such analysis relies on a high degree of precision in three measurements: weight, temperature, and temperature change. Specifically, TGA is the process of heating a mixture to a high enough temperature so that one of the components decomposes into a gas, which dissociates into the air. The TGA process utilizes heat and stoichiometry ratios to determine the percent by mass ratio of a solute.

As used herein, "nanoscopic-scale", "nanoscopic", "nanometer-scale", "nanoscale", "nanocomposites", "nanoparticles", the "nano-" prefix, and the like generally refers to elements or articles having widths or diameters of less than about 1 µm, preferably less than about 100 nm in some cases. In all embodiments, specified widths can be smallest width (i.e. a width as specified where, at that location, the article can have a larger width in a different dimension), or largest width (i.e. where, at that location, the article's width is no wider than as specified, but can have a length that is greater).

As used herein, a "nanostructure" refers to an object of intermediate size between molecular and microscopic (micrometer-sized) structures. In describing nanostructures, the sizes of the nanostructures refer to the number of dimensions on the nanoscale. For example, nanotextured surfaces have one dimension on the nanoscale, i.e., only the thickness of the surface of an object is between 0.1 and 1000 nm. A list of nanostructures includes, but not limited to, nanoparticle, nanocomposite, quantum dot, nanofilm, nanoshell, nanofiber, nanoring, nanorod, nanowire, nanotube, nanocapillary structures, and so on.

As used herein, the terms "comprising", "including", "carrying", "having", "containing", "involving", and the like are to be understood to be open-ended, i.e., to mean including but not limited to.

As used herein, "plurality" means two or more.

OVERVIEW OF THE INVENTION

Based on CNT's remarkable properties, they have potential of serving as active materials in a number of applications that require the continuous monitoring of the integrity of large-scale structures such as composite tanks. Their superelastic properties also mean they can be bent to large degrees and recover. Using the piezoresistivity of CNTs, i.e., change in resistance with strain, and the possibility of integrating the CNTs in large area films, indicated the possibility of using them as a novel strain sensor for high pressure tanks and devices. In the case of a composite tank, there is a need to sense small changes in surface strain that may not be detected by existing strain gauges. Current strain gauges are limited by only being able to measure the strains on structural surfaces in designated directions and locations and do not have the sensitivity to detect small strains.

According to the invention, a novel carbon nanotube thin film is applied to carbon fiber composites for structural monitoring. Applying a load using a 3-point bend test to simulate bowing of a tank wall, induced significant increases in the film's electrical resistance at small deflections. Upon release of the load, the resistance returned to its approximate start value and is reproducible over multiple tests. The results show that a carbon nanotube thin film has great potential for the health monitoring of composite structures.

In various embodiments, the present invention presents that CNT films have the ability to very accurately detect minor surface deformations of the supporting substrates by a simple change in their electrical resistivity and current-voltage (I-V) diagrams. The elegance of the method reflects in the simple CNT film deposition by air-spraying, and the connection of the film to a continuous voltage difference. The current can be continuously monitored and any change is immediately related to a stretching of the films and concurrently a possible deformation of the substrate. In this disclosure, the sample coupons were subjected to a 3-point bend test to simulate the bowing of the side of a tank. In pressure testing large tanks, bowing, or strain in weak points may not be obvious, and there is a need to detect very small changes in the structural integrity. This approach can be used for a large number of applications that range from high pressure tanks to avionics and space explorations.

The present invention can also be practiced in various other embodiments.

For example, in one aspect, the present invention relates to a layered structure usable in a strain sensor. The layered structure has a substrate with a first surface and an opposite, second surface defining a body portion therebetween, and a film of carbon nanotubes deposited on the first surface of the substrate, wherein the film of carbon nanotubes is electrically conductive and characterized with an electrical resistance, where the substrate is insulative.

In one embodiment, the substrate includes a carbon composite material to allow material compatibility between the carbon-based substrate and the film of carbon nanotubes.

In one embodiment, the carbon nanotubes are aligned in a preferential direction. In one embodiment, the carbon nanotubes are formed in a yarn such that any mechanical stress increases their electrical response.

In one embodiment, the carbon nanotubes are incorporated into a polymeric scaffold that is attached to the surface of the substrate.

In one embodiment, the surfaces of the carbon nanotubes are functionalized such that its electrical conductivity is increased.

In one embodiment, the layered structure further includes a flexible polymeric film placed between the carbon nanotubes and the substrate, wherein the mechanical properties of the flexible polymeric film match that of the substrate.

In one embodiment, the carbon nanotubes have multi-wall carbon nanotubes, where the film of multi-wall carbon nanotubes is formed with superelasticity.

In one embodiment, the film of multi-wall carbon nanotubes is formed such that the electrical resistance is a function of a stress applied to the film of multi-wall carbon nanotubes. The electrical resistance in one embodiment is a linear function of the stress applied to the film of multi-wall carbon nanotubes.

In one embodiment, the multi-wall carbon nanotubes are formed with inner diameters in a range of about 2-8 nm, outer diameters in a range of about 10-30 nm, and lengths in a range of about 5.0-50 micros or longer.

In another aspect, the present invention relates to a method of fabricating a layered structure usable in a strain sensor. In the one embodiment, the method includes providing a substrate having a first surface and an opposite, second surface defining a body portion therebetween, and depositing a film of carbon nanotubes on the first surface of the substrate, wherein the film of carbon nanotubes is electrically conductive and characterized with an electrical resistance.

In one embodiment, the step of depositing the film of carbon nanotubes comprises the steps of functionalizing the plurality of multi-wall carbon nanotubes with desired functional groups or mixing the plurality of multi-wall carbon nanotubes with desired surfactants to form a homogenous aqueous suspension, and depositing the homogenous aqueous suspension on the first surface of the substrate, wherein the step of functionalizing the plurality of multi-wall carbon nanotubes is performed through a nitric acid treatment or a thyonil chloride treatment.

In one embodiment, the step of depositing the homogenous aqueous suspension is performed through painting, spraying, printing, growing, or a combination of them.

Additionally, the method also has the step of heating the deposited homogenous aqueous suspension on the first surface of the substrate so as to form the film of carbon nanotubes thereon.

The method may further include synthesizing a plurality of multi-wall carbon nanotubes.

In one embodiment, the substrate is insulative. The substrate comprises a carbon composite material to allow material compatibility between the carbon-based substrate and the film of carbon nanotubes.

The carbon nanotubes comprise multi-wall carbon nanotubes.

In one embodiment, the film of multi-wall carbon nanotubes is formed to have superelasticity. The film of multi-wall carbon nanotubes is formed such that the electrical resistance is a function of a stress applied to the film of multi-wall carbon nanotubes.

In one embodiment, the electrical resistance is a linear function of the stress applied to the film of multi-wall carbon nanotubes.

In one embodiment, the multi-wall carbon nanotubes are formed with inner diameters in a range of about 2-8 nm, outer diameters in a range of about 10-30 nm, and lengths in a range of about 5.0-50 micros or longer.

In yet another aspect, the present invention relates to a strain sensor. In one embodiment, the strain sensor has a substrate with a first surface and an opposite, second surface defining a body portion therebetween, and a film of carbon nanotubes deposited on the first surface of the substrate, wherein the film of carbon nanotubes is electrically conductive and characterized with an electrical resistance that is changeable in response to a change in an environment surrounding the film of carbon nanotubes.

The strain sensor may also have a first electrically conducting terminal positioned in a first place of the film of carbon nanotubes, and a second electrically conducting terminal positioned in a second place of the film of carbon nanotubes, where the first and second electrically conducting terminals are positioned apart such that in use, an electrically conductive path is formed therebetween to detect changes in the electrical resistance of the film of carbon nanotubes in response to the change in the environment surrounding the film of carbon nanotubes. Each of the first and second electrically conducting terminals is formed of an electrically conductive material.

In one embodiment, the change in the environment surrounding the film of carbon nanotubes comprises a change in a stress applied to the film of carbon nanotubes, a change in a temperature at the film of carbon nanotubes, or a change in a pressure applied to the film of carbon nanotubes.

The substrate is insulative. In one embodiment, the substrate comprises a carbon composite material so as to allow material compatibility between the carbon-based substrate and the film of carbon nanotubes.

In one embodiment, the carbon nanotubes are aligned in a preferential direction. In one embodiment, the carbon nanotubes are formed in a yarn such that any mechanical stress increases their electrical response.

In one embodiment, the carbon nanotubes are incorporated into a polymeric scaffold that is attached to the surface of the substrate.

In one embodiment, the surfaces of the carbon nanotubes are functionalized such that its electrical conductivity is increased.

In one embodiment, the layered structure further includes a flexible polymeric film placed between the carbon nanotubes and the substrate, wherein the mechanical properties of the flexible polymeric film match that of the substrate.

In one embodiment, the carbon nanotubes comprise multi-wall carbon nanotubes, wherein the film of multi-wall carbon nanotubes is formed to have superelasticity.

In one embodiment, the film of multi-wall carbon nanotubes is formed such that the electrical resistance is a function of a stress applied to the film of multi-wall carbon nanotubes. The electrical resistance is a linear function of the stress applied to the film of multi-wall carbon nanotubes.

In one embodiment, the multi-wall carbon nanotubes are formed with inner diameters in a range of about 2-8 nm, outer diameters in a range of about 10-30 nm, and lengths in a range of about 5.0-50 micros or longer.

In a further aspect, the present invention relates to a strain sensor. In one embodiment, the strain sensor has a substrate with a first surface and an opposite, second surface defining a body portion therebetween, and a film of nanostructures formed on the first surface of the substrate, wherein the film of nanostructures is electrically conductive and characterized with one or more desired characteristic properties that are changeable in response to a change in an environment surrounding the film of nanostructures. In one embodiment, the change in the environment surrounding the film of nanostructures comprises a change in a stress applied to the film of nanostructures, a change in a temperature at the film of nanostructures, or a change in a pressure applied to the film of nanostructures. In one embodiment, the one or more desired characteristic properties comprises an electrical resistance.

In one embodiment, the strain sensor further has a first electrically conducting terminal positioned in a first place of the film of nanostructures; and a second electrically conducting terminal positioned in a second place of the film of nanostructures, wherein the first and second electrically conducting terminals are positioned apart such that in use, a conductive path is formed therebetween to detect changes in the electrical resistance of the film of nanostructures in response to the change in the environment surrounding the film of nanostructures. In one embodiment, the electrical resistance is a linear function of a stress applied to the film of nanostructures.

In one embodiment, each of the first and second electrically conducting terminals is formed of an electrically conductive material.

In one embodiment, the first and second electrically conducting terminals are electrically connectable to a DC or AC power supply and an I-V reader.

In one embodiment, the first and second electrically conducting terminals are electrically coupleable to a signal transmitter to transmit signals corresponding to changes in the electrical resistance or desired characteristic properties of the film of nanostructures in response to a change in the environment, wherein the signal transmitter comprises an RFID/antenna.

In one embodiment, the nanostructures are aligned in a preferential direction.

In one embodiment, the nanostructures are formed in a yarn such that any mechanical stress increases their electrical response.

In one embodiment, the nanostructures are incorporated into a polymeric scaffold that is attached to the surface of the substrate.

In one embodiment, the surfaces of the nanostructures are functionalized such that its electrical conductivity is increased.

In one embodiment, the layered structure further includes a flexible polymeric film placed between the nanostructures and the substrate, wherein the mechanical properties of the flexible polymeric film match that of the substrate.

In one embodiment, the nanostructures comprise nanoparticles, nanocomposites, nanofilms, nanoshells, nanofibers, nanorings, nanorods, nanowires, nanotubes, nanocapillaries, or a combination of them. For example, the nanostructures in one embodiment include single walled carbon nanotubes, double walled carbon nanotubes, multi-wall carbon nanotubes, graphemes or graphitic nano materials, or a combination of them. In one embodiment, the graphemes or graphitic nano materials are mixable or mixed with metal nano particles or metal oxide nano particles. In another embodiment, the graphemes or graphitic nano materials are mixable or mixed with polymers.

In another embodiment, the nanostructures comprise magnetic nano/micro structures along with graphitic nano particles to allow the film of nanostructures to have magnetic properties.

In one embodiment, the strain sensor further has a layer of polymer formed at least partially over the film of nanostructures. The strain sensor may also have a layer of metallic material formed at least partially over the film of nanostructures, and a protective layer at least partially over the layer of metallic material.

In one embodiment, the film of nanostructures is formed on the first surface of the substrate through spraying, painting, growing, or printing, or a combination of them.

In one embodiment, the film of nanostructures is formed as an integral part of the substrate.

In one embodiment, the substrate is a surface of a plane frame, a tank, or a structure that is changeable in response to a change in an environment surrounding the structure.

These and other aspects of the present invention are more specifically described below.

IMPLEMENTATIONS AND EXAMPLES OF THE INVENTION

Without intent to limit the scope of the invention, exemplary methods and their related results according to the embodiments of the present invention are given below. Note that titles or subtitles may be used in the examples for convenience of a reader, which in no way should limit the scope of the invention. Moreover, certain theories are proposed and disclosed herein; however, in no way they, whether they are right or wrong, should limit the scope of the invention so long as the invention is practiced according to the invention without regard for any particular theory or scheme of action. It should be appreciated that while these techniques are exemplary of preferred embodiments for the practice of the invention, those of skill in the art, in light of the present disclosure, will recognize that numerous modifications can be made without departing from the spirit and intended scope of the invention.

As disclosed in the invention, CNT films have the ability to very accurately detect minor surface deformations of the supporting substrates by a simple change in their electrical resistivity and current-voltage (I-V) diagrams. This approach can be used for a large number of applications that range from high pressure tanks to avionics and space explorations. The elegance of the method includes the simple CNT film deposition by air-spraying, and the connection of the film to a continuous voltage difference. The current can be continuously monitored and any change is immediately related to a stretching of the films and concurrently a possible deformation of the substrate. Without intent to limit the scope of the invention, an example of carbon nanotube coatings as used in strain sensors for composite tanks is discussed as below. In the example, the coupons were subjected to a 3-point bend test to simulate the bowing of the side of a tank. In pressure testing large tanks, bowing, or strain in weak points may not be obvious, and there is the need to detect very small changes in the structural integrity.

Catalyst Preparation

According to one embodiment of the present invention, the Fe—Co/$CaCO_3$ (about 2.5:2.5:95 wt. %) catalyst system utilized for the MWCNT growth was prepared as previously described [25]. The $Fe(NO_3)_3.9H_2O$ and $Co(CH_3COO)_2.4H_2O$ metal salts were completely dissolved in DI water under continuous stirring. Next, the $CaCO_3$ support was added to this mixture and the solution was stirred and subsequently sonicated for about 30 minutes. In order to avoid the release of $CO_2$, ammonia was added to the final solution until its pH reached about 7.5. A steam bath setup was used to evaporate the water while the solution was constantly stirred. Lastly, the catalyst system was dried overnight at about 100° C. and calcinated at about 600° C. for about 2 hours.

Carbon Nanotube Synthesis

MWCNTs were synthesized on the Fe—Co/$CaCO_3$ catalyst system using a radio frequency (RF) chemical vapor deposition (CVD) method [25]. The catalyst system (about 100 mg) was deposited into a thin layer on a graphite susceptor which was positioned inside of a quartz tube. The latter was placed at the center of the RF generator and purged with nitrogen at about 200 ml/min for about 10 minutes. Next, the RF generator was turned on and when the temperature reached about 720° C., acetylene was introduced at about 3.3 ml/min for about 30 minutes. Finally, the product was allowed to cool down under nitrogen for about 10 minutes.

The as-produced MWCNTs were purified using diluted nitric acid ($HNO_3$)/$H_2O$ (1:1 by volume) solution. The acid nanotube mixture was continuously stirred overnight at about 100° C. and during this purification process carboxylic functional groups (COOH) are attached on the surface of the carbon nanotubes. Next, the mixture was filtered through an Isopore membrane filter with about 0.2 µm pore size (from Millipore) and was washed with DI water until the pH was neutral and all the acid was completely removed.

Carbon Nanotube Characterization

In one embodiment, the purified MWCNTs were characterized by transmission electron microscopy (TEM), thermo-gravimetric analysis (TGA), and Raman scattering spectroscopy, respectively. The deposited film was characterized by scanning electron spectroscopy (SEM) and x-ray photoelectron spectroscopy (XPS).

Low and high resolution TEM images of the CNTs were obtained using on a field emission JEM-2100F TEM (JEOL Inc., Peabody, Mass.) supplied with a CCD camera. The acceleration voltage was set to be about 100 kV. The functionalized MWCNTs were homogeneously dispersed in isopropanol and tip sonicated for about 30 minutes. Next, a few drops of the suspension were deposited on the TEM grid and air dried before analysis.

A Mettler Toledo TGA/SDTA 851e was utilized to perform thermo-gravimetric analyses and determine the thermal properties of MWCNTs. Approximately about 3 mg of the purified MWCNTs was heated from about 25 to 800° C. at a heating rate of about 5° C./min, under air flow of about 150 ml/min.

Raman scattering studies of the MWCNTs were performed at room temperature using Horiba Jobin Yvon LabRam HR800. Before each analysis, the Raman spectrometer was calibrated using a silicon wafer with a known Raman peak at about 521 $cm^{-1}$. The He—Ne laser (about 633 nm) with a power of 5 mW was utilized as an excitation source.

A JEM-7500F field emission SEM was used to take low and high resolution images of the as-deposited CNT films. A low accelerating voltage of about 2 kV was used to prevent charging up of the CNTs in the films at a working distance of about 7-11 mm.

XPS analysis was performed on a Thermo Scientific K-Alpha spectrometer utilizing an Al kα x-ray source with energy of about 1486.6 eV at a background pressure of about $1\times10^{-9}$ mbar. The spot size used was about 400 µm. Survey scans were acquired to obtain the relative elemental composition of the as-received carbon composite coupon surface, and of the CNT film after deposition onto the coupons. The relative elemental atomic concentrations were calculated using sensitivity factors provided by the manufacturer with the instrument. Narrow scans at higher energy resolution of the C1s peak were performed on the as-received coupon and after CNT film deposition to determine chemical state information of the film. The C1s peak was reference to the C—C/C—H peak at 284.6 eV.

Carbon Nanotube Deposition

Figure 2:
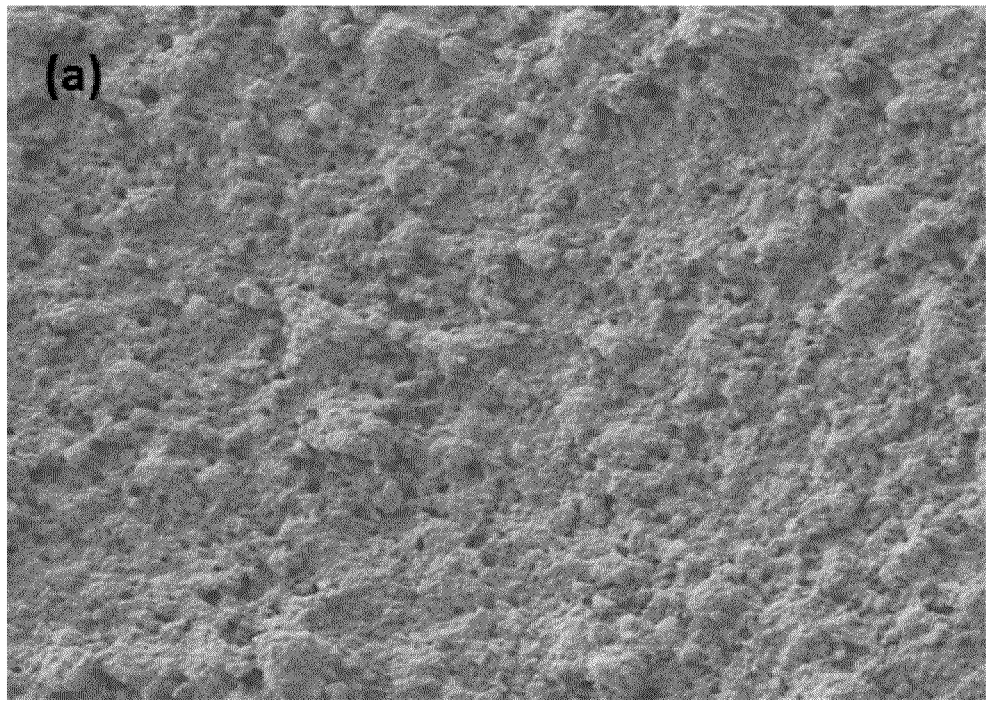
FIG. 2 shows (a) Low resolution SEM image of the MWCNT coating on the coupon, and (b) High resolution SEM image, according to one embodiment of the present invention.
Figure 2:
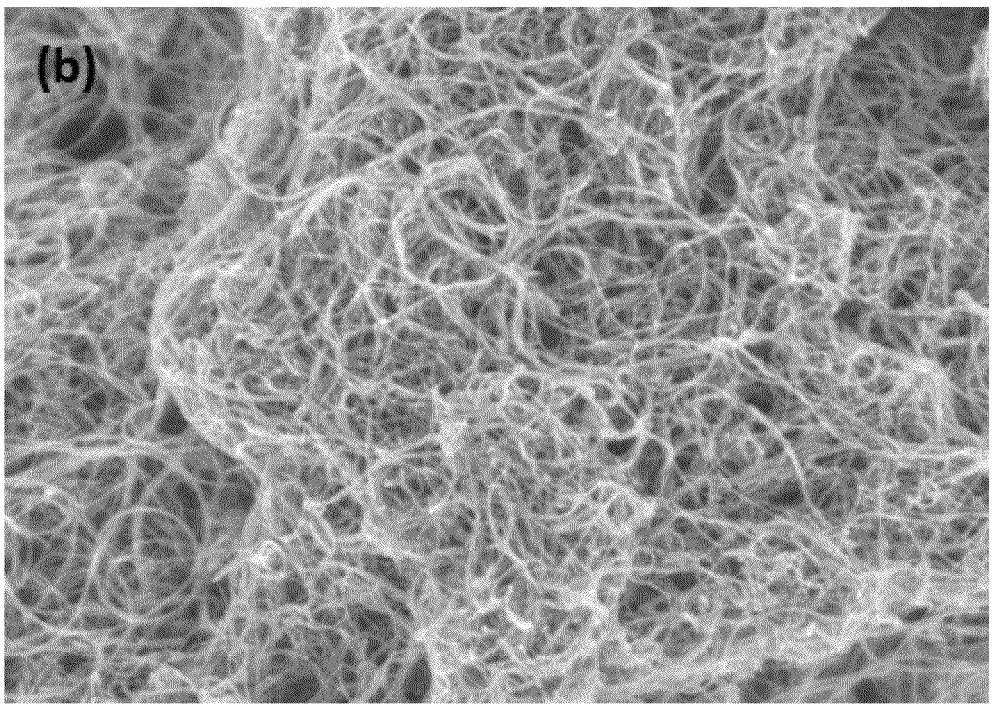

Various methods can be used for film deposition. Since CNTs are inherently hydrophobic and tend to agglomerate due to the strong van der Waal forces, they usually have to be functionalized with different functional groups or mixed with various surfactants in order to achieve a homogenous dispersion. MWCNTs were functionalized through a nitric acid treatment or a thyonil chloride treatment to improve their water solubility and ensure a more uniform solution. The purified MWCNTs were added to about 30 ml of DI $H_2O$ at about 0.3 mg/ml concentration and tip sonicated for one hour. The homogenous aqueous suspension was deposited on coupons fabricated from a carbon composite material from a cryogenic tank of dimensions about 100 mm×50 mm×3.33 mm through an airbrushing technique as previously described [26]. An optical micrograph of the coupon surface is shown in FIG. 1 where the woven construction of the carbon fibers is evident. Approximately, about 90 ml of the nanotube suspension was deposited on each coupon. During the deposition process, the coupons were placed on a heating stage and heated up at about 100° C. allowing the water to evaporate, while leaving behind nanotubes uniformly deposited on the coupon surface. FIG. 2 shows SEM images of the deposited CNT film at low and high magnifications.

Strain Testing

Figure 3:
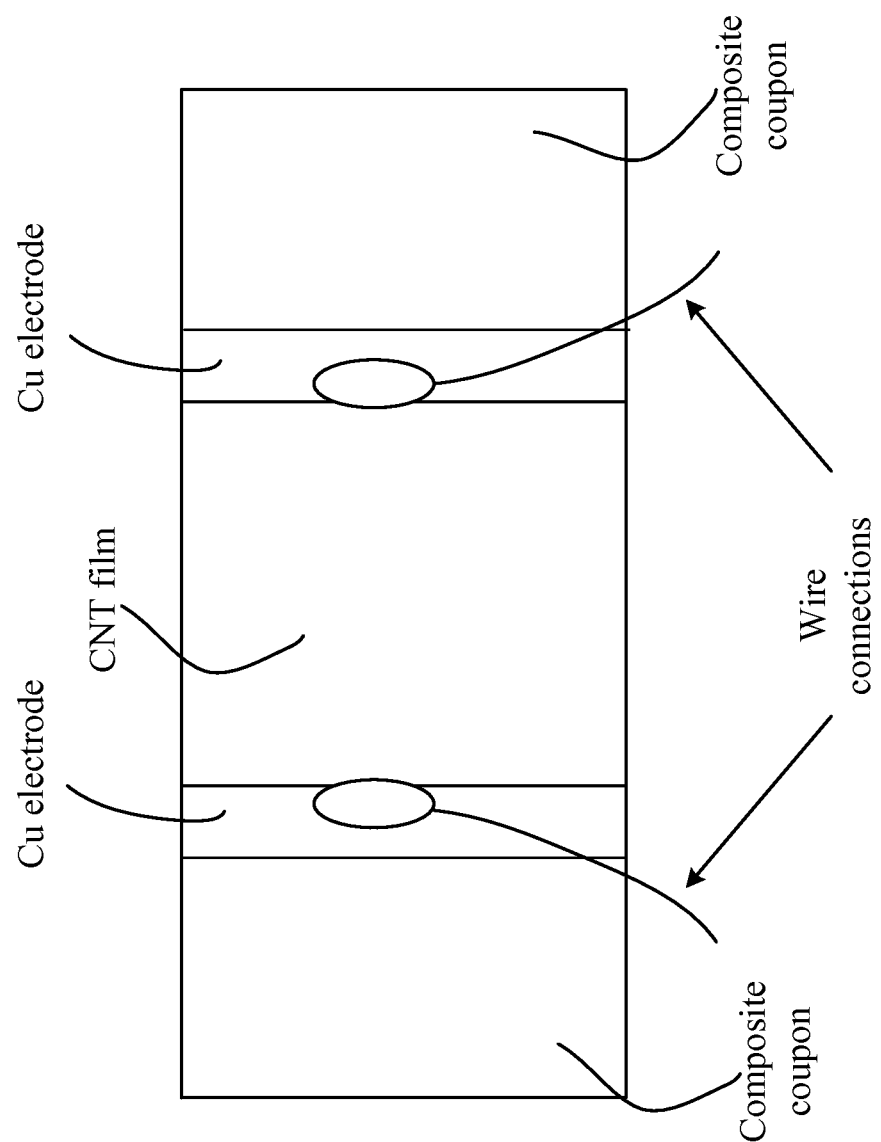
FIG. 3 shows CNT coated composite coupon showing set-up for testing. The CNT film was scraped off each end of the coupon so there would be no electrical contact of the CNT film with the Instron anvil.
Figure 4:
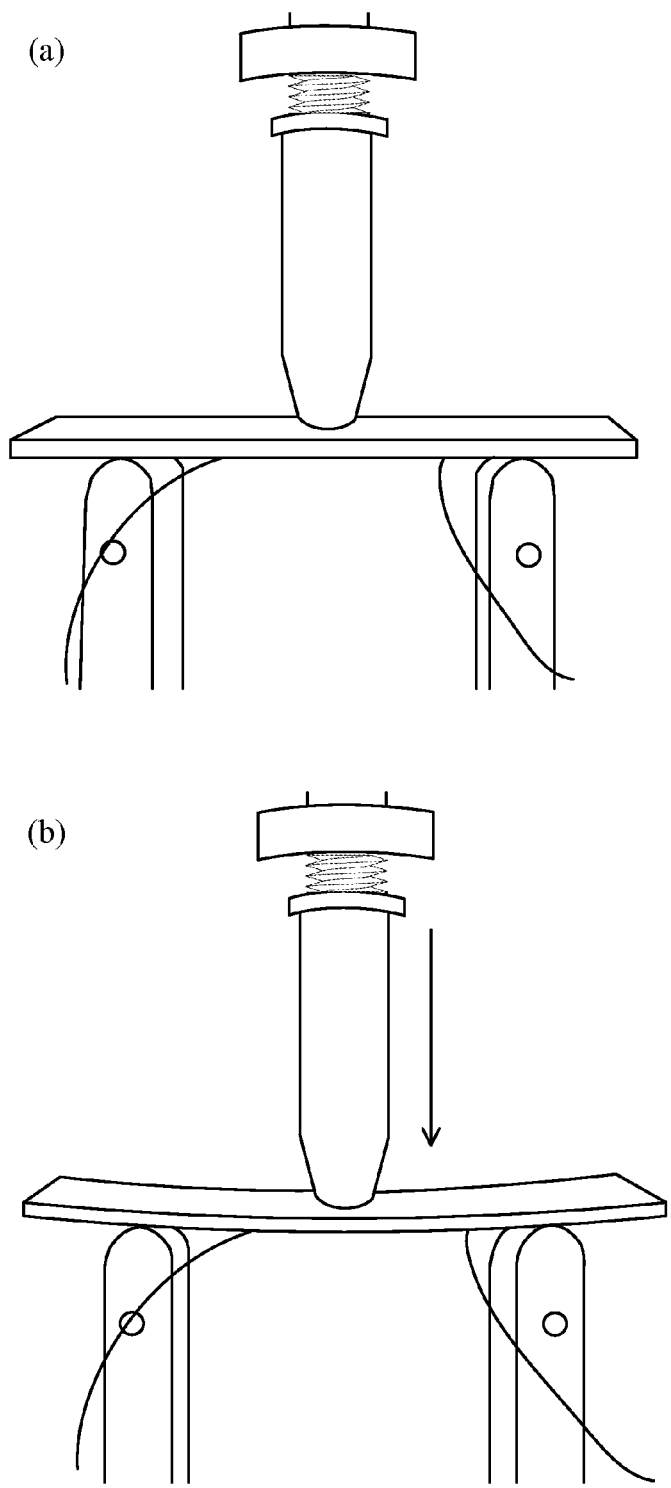
FIG. 4 shows the CNT coated coupon as mounted in the Instron for the 3-point bend test at t=0 secs (a). The CNT coated coupon at the conclusion of the 3-point bend test at t=52 secs (b). Maximum deflection of the coupon was 2.61 mm.

In one embodiment, the coupons were masked with an about 37.5 mm strip across the center of the film coated side, and then a thin copper film was applied by sputter deposition to provide conductive connection points for the wires. Wires were silver solders connected to points on the copper film on each side of the CNT film so they were within the anvil span of the 3-point flexure fixture on the Instron, and encapsulated with an epoxy to provide extra strength, as shown in FIG. 3. Areas at the end of each coupon were then scraped with a scalpel blade to remove the unnecessary copper film, as shown in FIG. 3, so that the composite coupon could be mounted to the 3-point bend test fixture without shorting the connections and CNT film to ground, as shown in FIGS. 4(a) and 4(b). The 3-point bend tests were performed on Instron Model 3344 2kN table top tensile tester equipped with a flexure fixture utilizing Series IX/s software. The tests were performed at a speed of about 0.05 mm/s to a maximum load of about 2 kN. Preliminary testing on blank coupons to the maximum load of about 2 kN showed an extension (deflection of the coupon) of about 2.61 mm with a flexure stress of about 355.45 MPa and flexure strain of about 1.26%. A low voltage of about 100 mV was applied across the film, and the current through the CNT film was monitored using a precision electrometer (Keithley Model 6514).

Results and Further Discussions

Various methods can be used for film deposition such as spraying, printing or growing. Since CNTs are inherently hydrophobic and tend to agglomerate due to the strong van der Waal forces, they usually have to be functionalized with different functional groups or mixed with various surfactants in order to achieve a homogenous dispersion. MWCNTs were functionalized through a nitric acid treatment or a thyonil chloride treatment to improve their water solubility and ensure a more uniform solution. The purified MWCNTs were added to about 30 ml of DI $H_2O$ at about 0.3 mg/ml concentration and tip sonicated for one hour. The homogenous aqueous suspension was deposited on coupons fabricated from carbon composite material from a cryogenic tank of dimensions about 100 mm×50 mm×3.33 mm through an airbrushing technique as previously described [26]. An optical micrograph of the coupon surface is shown in FIG. 1 where the woven construction of the carbon fibers is evident. Approximately, about 90 ml of the nanotube suspension was deposited on each coupon. During the deposition process, the coupons were placed on a heating stage and heated up at about 100° C. allowing the water to evaporate, while leaving behind nanotubes uniformly deposited on the coupon surface. FIG. 2 shows SEM images of the deposited CNT film at low and high magnifications.

Crystallinity, purity, wall number and tube length are some of the main parameters that greatly influence the optical, thermal, mechanical and electrical properties of CNTs. In particular CNTs with high crystallinity and very few structural defects are shown to possess higher electrical, thermal, optical and mechanical properties [27, 28]. Long CNTs are shown to exhibit better electrical properties when compared to the shorter ones. Wall number also plays a very important role on the opto-electronic, thermal and electrical properties of CNTs leading to the need to synthesize species of nanotubes with specific number of walls (1, 2, 3, multi-walls) for applications that require the use of these materials for electrically conductive films [29-32]. The mechanical properties are also dependent on the type of CNTs, where MWCNTs were found to have higher Young's modulus than single-wall CNTs due to difference in the wall number, tube diameter and the van der Waals forces present between the tubes [33, 34].

Furthermore, impurities such as metal nano-particles that are present between the carbon nanotube bundles hinder their performance in several applications. Usually, nanotubes with higher purities demonstrate much better properties when compared to the ones containing various numbers of impurities such as catalytic metal nano-particles and amorphous carbon [35]. Raman spectroscopy has also demonstrated that the presence of impurities was found to influence the structural properties of CNTs [36]. Therefore, when utilizing carbon nanostructures for various applications, it is important to thoroughly characterize their properties by techniques such as microscopy, spectroscopy and thermal gravimetrical analysis.

Figure 5:
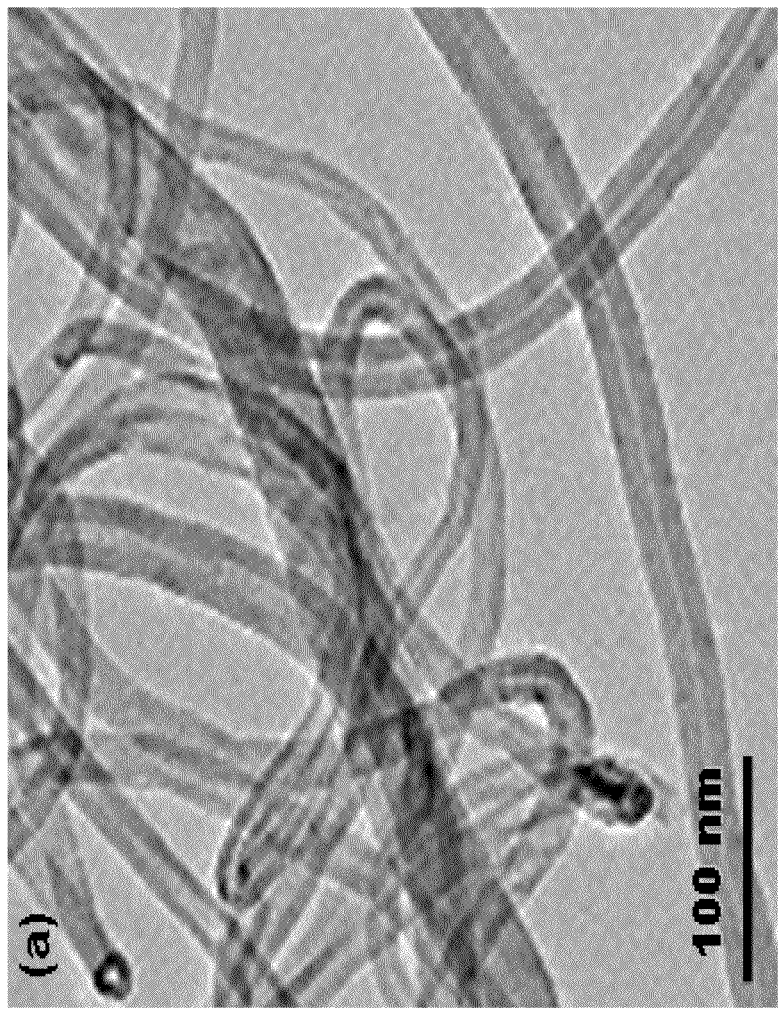
FIG. 5 shows TEM image of MWCNTs synthesized with acetylene.

TEM analysis indicated that the MWCNTs utilized in the example have outer diameters varying between about 15-30 nm and an average length of over 6 microns. The TEM image of MWCNTs is shown in FIG. 5, which indicates the presence of MWCNTs with an inner diameter of about 5 nm and an outer diameter of about 19 nm.

Figure 6:
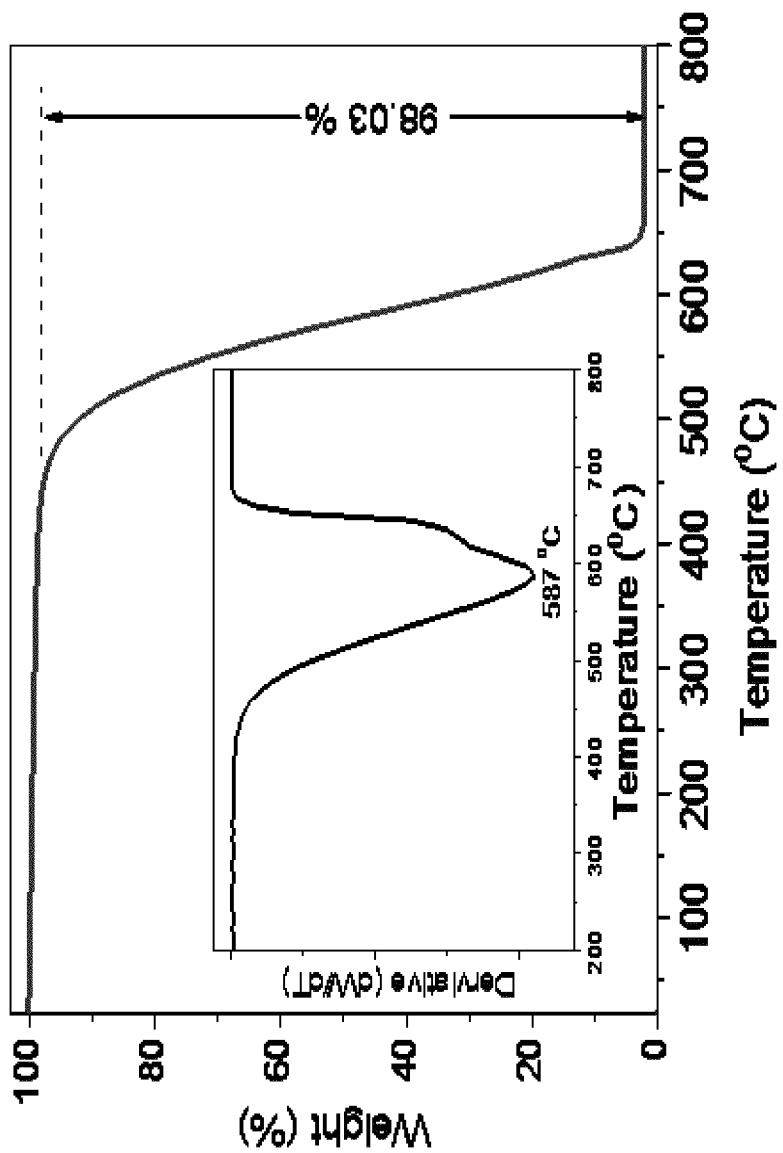
FIG. 6 shows the weight loss profile of the MWCNTs obtained during thermo-gravimetric analysis and (inset) the first derivative of the TGA curve indicating the combustion temperature for the purified nanotubes.

TGA was performed to determine the purity of MWCNTs. FIG. 6 shows the weight loss profile of the functionalized MWCNTs, revealing that their purity was found to be slightly higher than 98%. The remaining quantity (less than 2%) corresponds to the catalyst nano-particles that are still present within the bundles of CNTs or entrapped in the inner most cylinders of the MWCNTs and could not be removed after the first purification process. The TGA curve as well as its first derivative, as shown in the inset of FIG. 6, indicates that the decomposition temperature of the purified nanotubes was found to be at around 587° C. It has been reported that the combustion temperature of the CNTs depends on their morphological properties, where usually nanotubes with higher crystallinity decompose at a higher temperatures [37].

Figure 7:
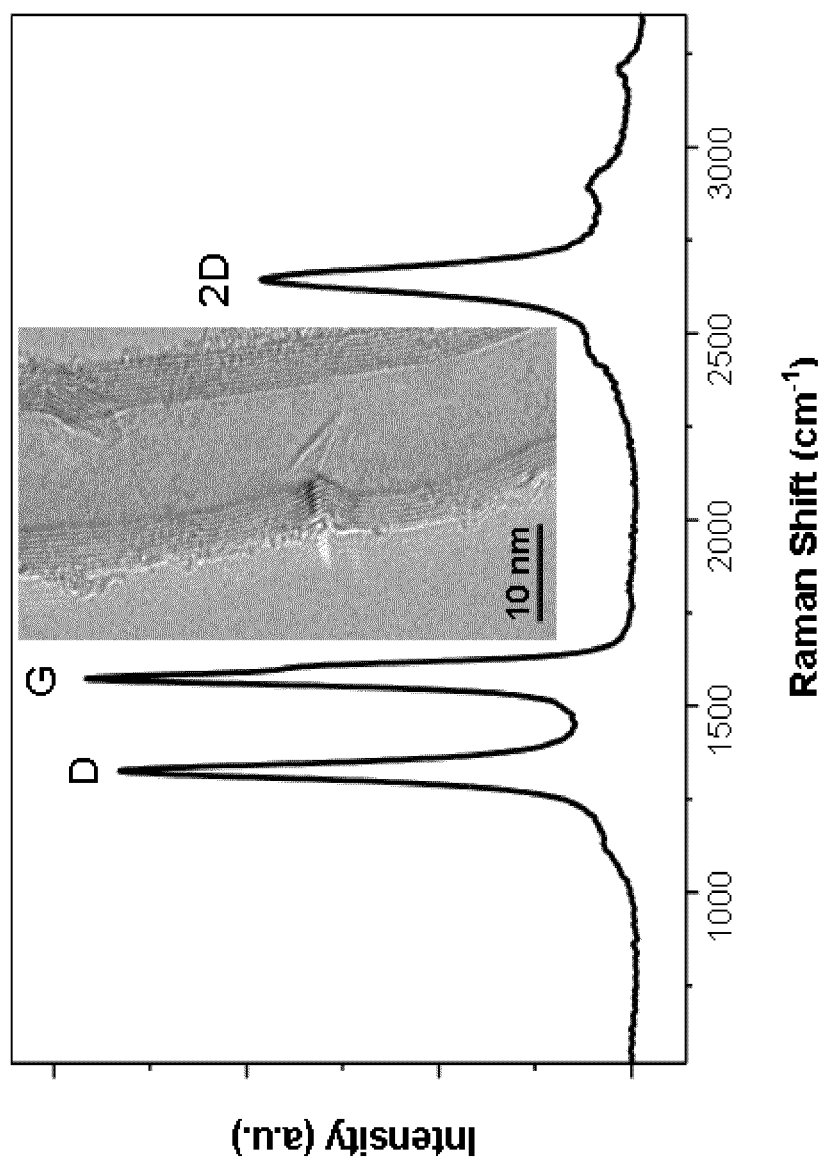
FIG. 7 shows Raman scattering spectra of the MWCNTs synthesized on the Fe—Co/$CaCO_3$ catalyst system, (inset) TEM image of a purified MWCNT.

Raman Spectroscopy is a non-destructive and widely used technique to characterize various carbon nano-structures. The D, G and 2D band are three characteristic bands found in the high frequency domain of the MWCNT Raman scattering spectrum. The D band is positioned between about 1300 and 1380 $cm^{-1}$ and is correlated with the presence of defects, impurities, amorphous carbon or other carbonaceous products, which are present in the CNT sample [38]. The G band, or also known as the tangential band, is present between about 1500 and 1630 $cm^{-1}$ and it corresponds to the $E_{2g}$ stretching modes in the graphite plane [39]. The last band present in the high frequency domain of the CNT spectra is the 2D band or the second-order harmonic of the D band. The latter is present between about 2450 and 2650 $cm^{-1}$ and it is often associated with the degree of the nanotube crystallinity [40]. FIG. 7 shows the Raman scattering spectrum of the purified MWCNTs collected with about 633 nm He—Ne laser. The inset shows a high resolution TEM image of a MWCNT with an outer diameter of about 22 nm. The relative high intensity of the 2D band indicates the presence of MWCNTs with high crystallinity. These findings were found to be in a very in good agreement with the TGA results.

The SEM images of the CNT deposited film (FIG. 2) showed an even distribution of the CNTs within the film. FIG. 2(b) showed the CNTs have a good uniform size consistent with the TEM analysis and also a good weave between CNTs providing a good conductive path through the coating. No impurities or defects were observed in the SEM images.

The relative elemental composition of the uncoated surface obtained from the XPS data is presented in Table 1. The data shows the presence of alcohol or ester (C—O) and aldehyde or ketone (C═O) groups [41] plus fluoropolymer, along with minor traces of contaminants. For the CNT coating, predominantly carbon, plus minor oxygen was detected and presented in Table 1, which is expected of a surface exposed to the environment. The C1s peak showed a typical C1s peak of that of graphite at about 284.4 eV [41] with the characteristic tail towards higher binding energy. No contaminants and lack of carbon functional groups indicates the high purity of the CNT coating.

TABLE 1

Relative Atomic Concentrations Determined by XPS of the Surface of the Uncoated and MWCNT Coated Carbon Fiber Coupon

|  | C | O | F | N | Si | Zn | Na | S | Ca | Cl |
|---|---|---|---|---|---|---|---|---|---|---|
| Uncoated | 65.9 | 19.0 | 7.7 | 2.3 | 1.6 | 1.3 | 0.95 | 0.54 | 0.49 | 0.23 |
| Coated | 96.2 | 3.8 | — | — | — | — | — | — | — | — |

Figure 8:
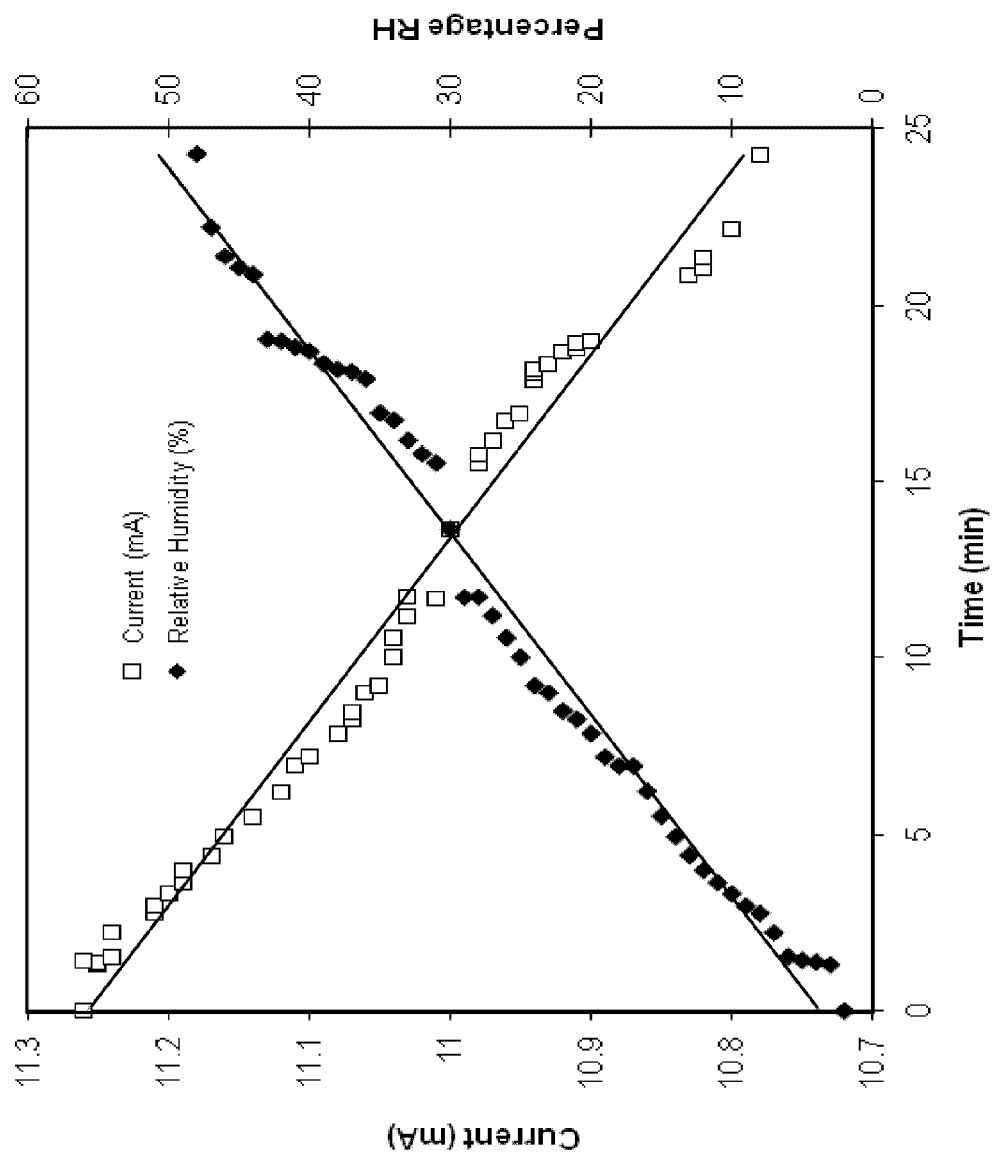
FIG. 8 shows current as measured through the CNT film at constant voltage as a function of relative humidity (RH %).
Figure 9:
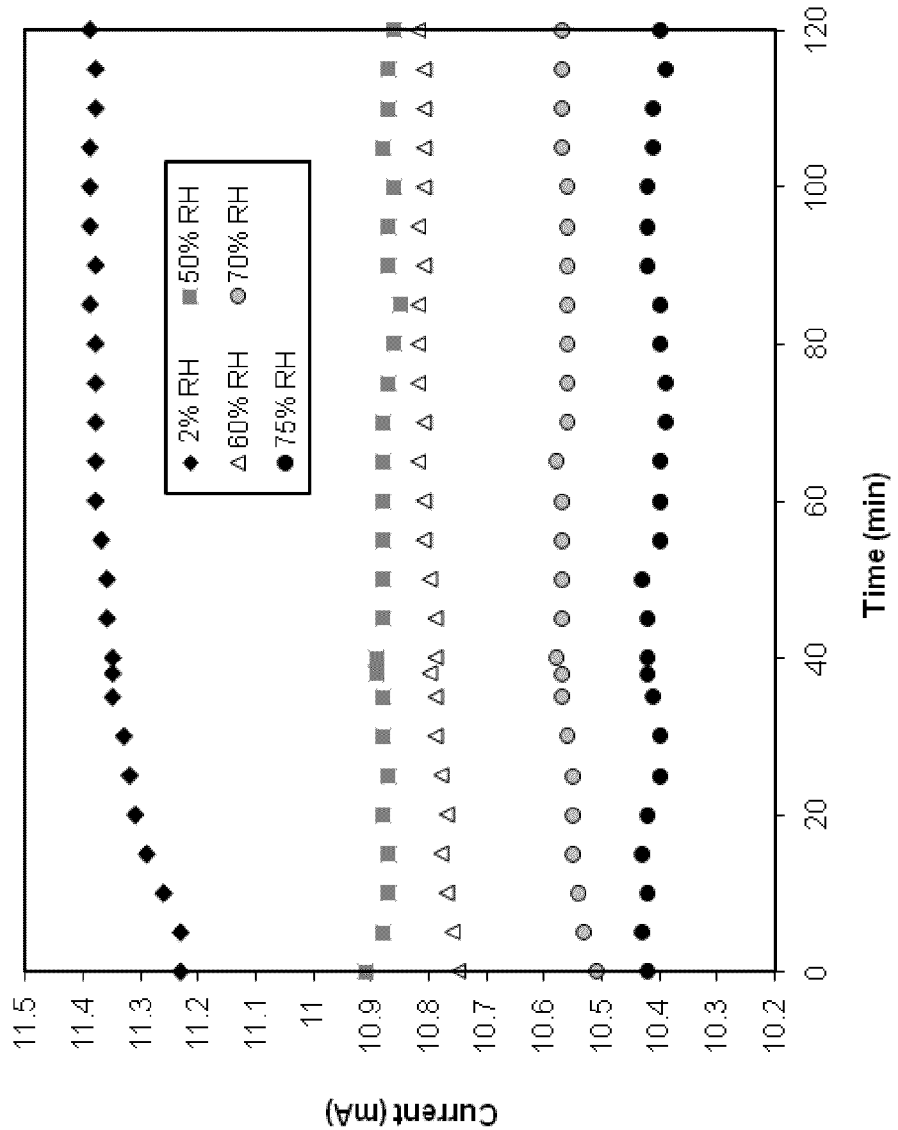
FIG. 9 shows current as measured through the CNT film at various RH % as a function of time.

Prior to the 3-point bend test, the CNT film resistance was measured under no load conditions to evaluate the stability of the films as a function of humidity. A fixed voltage of about 100 mV was applied to the films and the current through the film was monitored as a function of relative humidity (RH %) utilizing the environmental chamber in the laboratory. The change in the measured current is in direct proportion to the change in resistivity. The results are shown in FIG. 8 where a linear correlation between the increase in the RH % and decrease in current was observed. Secondly, the measured current as a function of fixed RH % was measured and showed good stability, as shown in FIG. 9, over a period of about 2 hours. The values for 2% RH were less stable but was probably due to the inaccuracy in measuring that low a RH. However, across the RH range monitored, the current changed by less than 1 mA, indicating that as long as the RH % was known and stable, reproducible and reliable data can be obtained.

Figure 10:
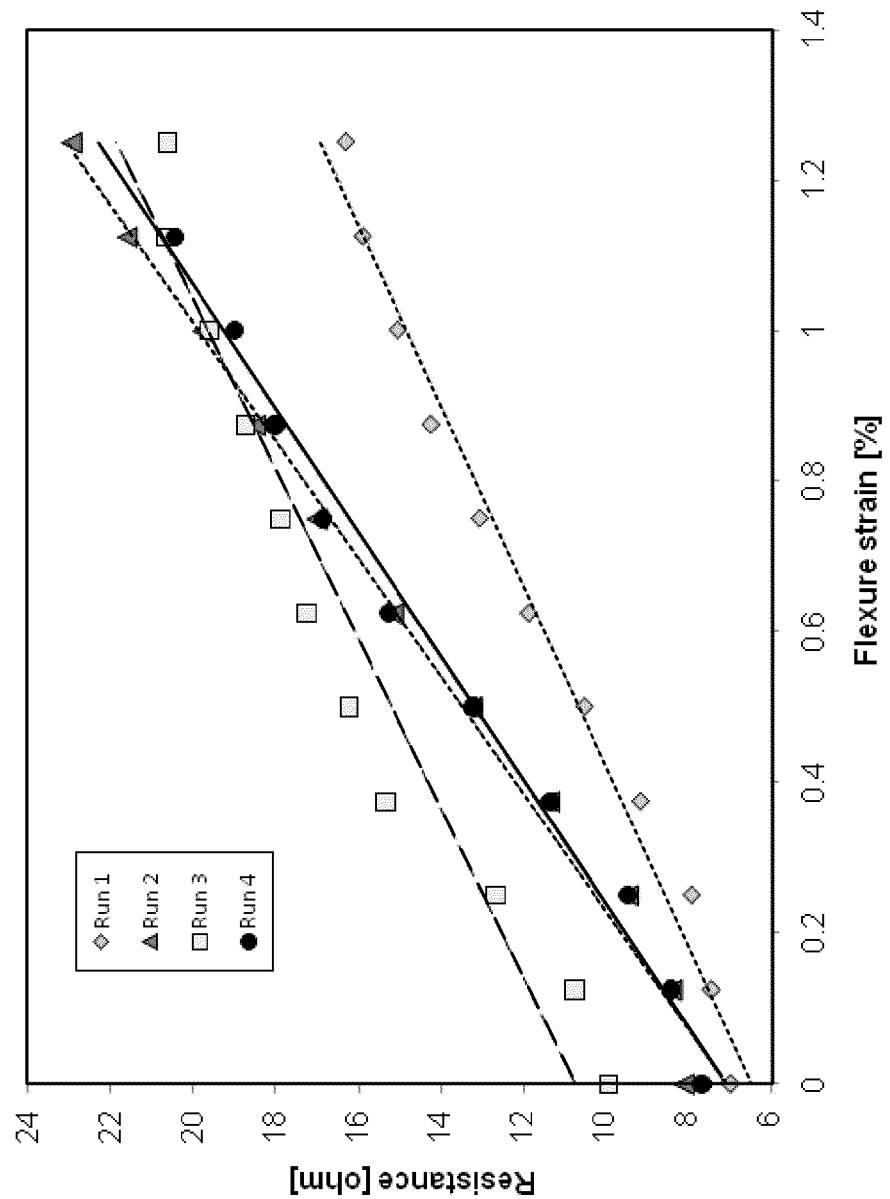
FIG. 10 shows resistance changes of the CNT film as a function of applied strain.

The coupon was then subjected to the 3-point bend test at a constant RH % to the maximum deflection measurement of about 2.61 mm, as shown in FIG. 4(b). Again a fixed voltage of about 100 mV was applied to the coupon and the current through the CNT film was monitored on an electrometer as a function of the applied stress to a maximum deflection of the coupon. The film resistance as a function of the applied stress was therefore calculated. Four total runs were performed on one coupon. A linear correlation between the applied stress and increase in the CNT film resistance was determined and shown in FIG. 10. The resistance values rose from about 6 to 7 ohm at the start to about 16-22 ohm at the maximum deflection. The small deviations between runs may be due to humidity fluctuations in the laboratory that could not be controlled as well as in the environmental chamber. At about 52 seconds at maximum load, the load was removed and the resistance value of the film returned to within a few % of the original values, as shown in Table 2. This recovery showed that the superelastic component of the CNT film had not been exceeded, the deflection of about 2.61 mm of the coupon being due to the load limit of the instrument.

TABLE 2

Resistance Measurements Across the Film at the Start, at Maximum Deflection, and After the Load was Removed for all Four Runs

| | Starting resistance [Ω] | Maximum resistance [Ω] | End resistance [Ω] |
|---|---|---|---|
| Run 1 | 6.99 | 16.32 | 7.04 |
| Run 2 | 8.11 | 22.53 | 8.44 |
| Run 3 | 9.91 | 20.94 | 7.92 |
| Run 4 | 7.67 | 20.46 | 7.70 |

The change in the current for a fixed voltage of about 100 mV as a function of humidity, as shown in FIGS. 8 and 9, corresponded to a maximum change in starting resistance of +/−0.5 ohm. This is small compared to the total change in resistance at maximum deflection indicating that resistance changes of greater than 1 ohm were significant showing that deflections as low as about 0.5 mm could be detected.

Moreover, a protective coating can be deposited over the films to protect them from the environment, and incorporating them into the composite itself. Furthermore, development of CNTs themselves that mimic the strength of the weakest carbon fiber (or slightly less) for incorporation in the composite structure itself can be used so that when the ultimate strength of the CNT was exceeded and the CNT broke, the resistance would be greatly and permanently changed indicating potential carbon fiber breakage and impending failure of the tank of structure. With future research underway to improve and develop ultralight linerless composite tanks for aircraft, launch vehicles, and in space propulsion [2, 42], the need for health monitoring for these tanks becomes critical.

Small deflections of a carbon composite coupon simulating the bowing of a tank wall could be easily detected using a MWCNT film. Due to the superelasticity of the MWCNT film, the resistance of the film returned to within a few percent the starting value and showed reproducible results over several runs. The films are also made up of MWCNTs in random directions, so that the resistance could be monitored independent of direction. Such films could also be incorporated into the carbon fiber structure. The results indicate the feasibility of using CNT films as structural health monitoring of composite tanks and structures.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

LIST OF REFERENCES

[1] T. DeLay, "Hybrid composite cryogenic tank structure", NASA Tech Briefs, January 2011. Available: http://www.techbriefs.com/component/content/article/9006.

[2] K. Ryan, J. Cronin, S. Arzberger, K. Mallick, and N. Munshi, "Prediction of pressure cycle induced microcrack damage in linerless composite tanks", Proc. AIAA/ASME/ASCE/AMS/ASC Structures, Structural Dynamics, and Materials Conf., Newport R1, 2006. AIAA2006-2201.

[3] Final report of the X-33 liquid hydrogen tank test investigation team, Marshall Space Flight Center, Huntsville, Ala., May 2000.

[4] Investigation of the cryogenic composite tank rupture type D/Close call mishap report, NASA IRIS Incident No. S-2008-359-00002, Feb. 20, 2009. Available: http://ksc-safety.ksc.nasa.gov/KSCSafetyMishaps.htm

[5] C. Li and T. W. Chou, "Atomistic modeling of carbon nanotube-based mechanical sensors", J. Intelligent Material Systems and Structures, vol. 17, no. 3, pp. 247-254, 2006.

[6] H. G. Craighead, "Nanoelectromechanical systems", Science, vol. 290, no. 5496, pp. 1532-1535, 2000.

[7] I. Kis and A. Zettl, "Nanomechanics of carbon nanotubes" Phil. Trans. R. Soc. A 13, vol. 366, no. 1870, pp. 1591-1611, 2008.

[8] E. Dervishi, Z. Li, Y. Xu, V. Saini, A. R. Biris, D. Lupu, and A. S. Biris, "Carbon nanotubes: Synthesis, properties, and applications", Particulate Science and Technology, vol. 27, pp. 107-125, 2009.

[9] Y. Zhu and H. D. Espinosa, "An electromechanical material testing system for in situ electron microscopy and applications", PNAS, 2005, vol. 102, pp. 14503-14508, 2005.

[10] K. J. Loh, J. P. Lynch, and N. A. Kotov, "Conformable single-walled carbon nanotube thin film strain sensors for structural monitoring", Proc. 5th International workshop on structural health monitoring, Stanford, Calif., September 2005.

[11] I. Kang, M. J. Schulz, J. H. Kim, V. Shanov, and D. Shi, "A carbon nanotube strain sensor for structural health monitoring", Smart Materials and Structures, vol. 15, pp. 737-748, 2006.

[12] M. Park, H. Kim, and J. Youngblood, "Strain-dependant electrical resistance of multi-walled carbon nanotube/polymer composite films", Nanotechnology, vol. 19, 055705 (7 pp) 2008.

[13] X. Li, C. Levy, and L. Elaadil, "Multiwalled carbon nanotube film for strain sensing", Nanotechnology, Vol. 19, 045501 (7 pp) 2008.

[14] S. M. Vemura, R. Wahi, S, Nagarajaiah, and P. M. Ajayan, "Strain sensing using a multiwalled carbon nanotube film", J. Strain Analysis, vol. 44, pp. 555-562, 2009.

[15] N. Koratkar, A. Modi, E. Lass, and P. Ajayan, "Temperature effects on resistance of aligned multiwalled carbon nanotube films", J. Nanosci. Nanotechnol., vol. 4, no. 7, pp. 744-748, 2004.

[16] W. Wang, P. Ciselli, E. Kuznetsov, T. Peijs, and A. H. Barber, "Effective reinforcement in carbon nanotube-polymer composites", Phil. Trans. R. Soc. A 13, vol. no. 366, 1870, pp. 1613-1626, 2008.

[17] L. Tong, X. Sun, and P. Tan, "Effect of long multi-walled carbon nanotubes on delamination toughness of laminated composites", J. Composite Materials, vol. 42, no. 1, pp. 5-23, 2008.

[18] B. Sulong, J. Park, N. Lee, and J. Goak, "Wear behavior of functionalized multi-walled carbon nanotube reinforced epoxy matrix composites", J. Composite Materials, vol. 40, no. 21, pp. 1947-1960, 2006.

[19] Y. C. Zhang and X. Wang, "Hygrothermal effects on interfacial stress transfer characteristics of carbon nanotubes-reinforced composites system", J. Reinforced Plastics and Composites, vol. 25, no. 1, pp. 71-88, 2006.

[20] R. L. Jacobsen, T. M. Tritt, J. R. Guth, A. C. Ehrlich, and D. J. Gillespie, "Mechanical properties of vapor-grown carbon fiber", Carbon, vol. 33, no. 9, pp. 1217-1221, 1995.

[21] M. M. J. Treacy, T. W. Ebbesen, and J. M. Gibson "Exceptionally high Young's modulus observed for individual carbon nanotubes", Nature vol. 381, pp. 678-680, 1996.

[22] E. W. Wong, P. E. Sheehan, and C. M. Lieber, "Nanobeam mechanics: elasticity, strength, and toughness of nanorods and nanotubes", Science, vol. 277, no. 5334, pp. 1971-1975, 1997.

[23] M-F. Yu, O. Lourie, M. J. Dyer, K. Moloni, T. F. Kelly, and R. S. Ruoff, "Strength and breaking mechanism of multiwalled carbon nanotubes under tensile load", Science, vol. 287, no. 5453, pp. 637-640, 2000.

[24] P. Poncharal, Z. L. Wang, D. Ugarte and W. A. de Heer, "Electrostatic deflections and electromechanical resonances of carbon nanotubes" Science, vol. 283, no. 5407, pp. 1513-1516, 1999.

[25] E. Dervishi, Z. Li, A. R. Bins, D. Lupu, S. Trigwell and A. S. Bins, "Morphology of multi-walled carbon nanotubes affected by the thermal stability of the catalyst system", Chem. Mater. vol. 19, pp. 179-184, 2007.

[26] Z. Li, H. R. Kandel, E. Dervishi, V. Saini, Y. Xu, A. R. Bins, D. Lupu, G. J. Salamo, and A. S. Bins, "Comparative study on different carbon nanotube materials in terms of transparent conductive coatings", Langmuir, vol. 24, no. 6, pp. 2655-2662, 2008.

[27] R. Jin, Z. X. Zhou, D. Mandrus, I. N. Ivanov, G. Eres, J. Y. Howe, A. A. Puretzky, and D. B. Geohegan, "The effect of annealing on the electrical and thermal transport properties of macroscopic bundles of long multi-wall carbon nanotubes" Physica, B, vol. 388, pp. 326-330, 2007.

[28] S. I. Jung, S. H. Jo, H. S. Moon, J. M. Kim, D. S. Zang, and C. J. Lee, "Improved crystallinity of double-walled carbon nanotubes after a high-temperature thermal annealing and their enhanced field emission properties", J. Phys. Chem. C, vol. 111, pp. 4175-4179, 2007.

[29] E. Dervishi, Z. Li, V. Saini, R. Sharma, Y. Xu, M. K. Mazumder, A. S. Bins, S. Trigwell, A. R. Bins, D. Saini, and D. Lupu, "Multifunctional coatings with carbon nanotubes for electrostatic charge mitigation and with controllable surface properties", IEEE Trans. Ind. Apps., vol. 45, no. 5, pp. 1547-1552, 2009.

[30] E. Dervishi, Z. Li, F. Watanabe, Y. Xu, V. Saini, A. R. Bins and A. S. Bins, "Thermally controlled synthesis of single-wall carbon nanotubes with selective diameters", J. Mater. Chem., vol. 19, pp. 3004-3012, 2009.

[31] A. R. Bins, D. Lupu, A. Grüneis, P. Ayala, M. H. Rümmel, T. Pichler, Z. Li, I. Misan, E. Dervishi, Y. Xu, and A. S. Bins, "High quality double wall carbon nanotubes grown by a cold-walled radio frequency chemical vapor deposition process", Chemistry of Materials, Vol. 20(10), pp. 3466-3472, 2008.

[32] Z. Li, H. R. Kandel, E. Dervishi, V. Saini, A. S. Bins, A. R. Bins and D. Lupu, "Does the wall number of carbon nanotubes matter as conductive transparent material?" App. Physics Letts., vol. 91, 053115, 2007 (3 pages).

[33] M. Meyyappan, Carbon Nanotubes: Science and Applications. Boca Raton, Fla.: CRC, 2005.

[34] E. Dervishi, Z. Li, Y. Xu, V. Saini, A. R. Bins, D. Lupu, and A. S. Bins, "Carbon nanotubes: Synthesis, properties, and applications", Particulate Science and Technology, vol. 27, pp. 107-125, 2009.

[35] Z. Li, A. S. Bins, E. Dervishi, V. Saini, Y. Xu, A. R. Bins and D. Lupu, "Influence of impurities on the x-ray photoelectron spectroscopy and Raman spectra of single-wall carbon nanotubes", J. Chem. Phys., vol. 127, 154713, 2007 (7 pages).

[36] L. E. McNeil, H. Park, J. P. Lu and M. J. Peters, "Effect of residual catalyst on the vibrational modes of single-walled carbon nanotubes," J. Appl. Phys. vol. 96, pp. 5158-5162, 2004.

[37] G. S. B. McKee and K. S. Vecchio, "Thermogravimetric analysis of synthesis variation effects on CVD generated multiwalled carbon nanotubes", J. Phys. Chem. B, vol. 110, no. 3, pp. 1179-1186, 2006.

[38] M. S. Dresselhaus and P. C. Eklund, "Phonons in carbon nanotubes", Advances in Physics, vol. 49, no. 6, pp. 705-814, 2000.

[39] E. F. Antunes, A. O. Lobo, E. J. Corat, V. J. Trava-Airoldi, A. A. Martin, and C. Veri'ssimo, "Comparative study of first- and second order Raman spectra of MWCNT at visible and infrared laser excitation", Carbon, vol. 44, pp. 2202-2211, 2006.

[40] M. S. Dresselhaus, G. Dresselhaus, R. Saito, and A. Jorio, "Raman spectroscopy of carbon nanotubes" Physics Reports, vol. 409, pp. 47-99, 2005.

[41] D. Briggs, in "Practical Surface Analysis Volume 1—Auger and X-ray Photoelectron Spectroscopy", D. Briggs and M. P. Seah (Eds.), John Wiley, Chichester, UK, 1990, p. 444.

[42] K. Mallick, J. Cronin, K. Ryan, S. Arzberger, and N. Munshi, "An integrated systematic approach to linerless composite tank development", Proc. 46th AIAA/ASME/ASCE/AMS/ASC Structure, Structural Dynamics and Materials Conference, Austin, Tex., 2005. AIAA 2005-2009.

What is claimed is:

1. A layered structure usable in a strain sensor, comprising:
a substrate with a first surface and an opposite, second surface defining a body portion therebetween;

a film of carbon nanotubes deposited on the first surface of the substrate, wherein the film of carbon nanotubes is electrically conductive and characterized with an electrical resistance; and a flexible polymeric film placed between the film of carbon nanotubes and the substrate, wherein the mechanical properties of the flexible polymeric film match that of the substrate;

wherein the substrate is insulative, and comprises a carbon composite material having a substantial amount of non-carbon elements, to allow material compatibility between the carbon-based substrate and the film of carbon nanotubes; and wherein the carbon nanotubes are randomly directed in the film, such that the resistance can be monitored independent of direction.

2. The layered structure of claim 1, wherein the carbon nanotubes comprise multi-wall carbon nanotubes.

3. The layered structure of claim 2, wherein the film of multi-wall carbon nanotubes is formed with superelasticity.

4. The layered structure of claim 2, wherein the film of multi-wall carbon nanotubes is formed such that the electrical resistance is a function of a stress applied to the film of multi-wall carbon nanotubes.

5. The layered structure of claim 4, wherein the electrical resistance is a linear function of the stress applied to the film of multi-wall carbon nanotubes, wherein the linear function is obtained using a 3-point bend test assembly.

6. The layered structure of claim 2, wherein the multi-wall carbon nanotubes are formed with inner diameters in a range of about 2-8 nm, outer diameters in a range of about 10-30 nm, and lengths in a range of about 5.0-50 micros or longer.

7. The layered structure of claim 1, wherein the carbon nanotubes are formed in a yarn such that any mechanical stress increases their electrical response.

8. The layered structure of claim 1, wherein the carbon nanotubes are incorporated into a polymeric scaffold that is attached to the surface of the substrate.

9. The layered structure of claim 1, wherein the surfaces of the carbon nanotubes are functionalized such that its electrical conductivity is increased.

10. A strain sensor comprising the layered structure of claim 1.

11. A strain sensor, comprising:
a substrate with a first surface and an opposite, second surface defining a body portion therebetween;
a film of carbon nanotubes deposited on the first surface of the substrate, wherein the film of carbon nanotubes is electrically conductive and characterized with an electrical resistance that is changeable in response to a change in an environment surrounding the film of carbon nanotubes; and
a flexible polymeric film placed between the film of carbon nanotubes and the substrate,
wherein the mechanical properties of the flexible polymeric film match that of the substrate;
wherein the substrate is insulative, and comprises a carbon composite material having a substantial amount of non-carbon elements, to allow material compatibility between the carbon-based substrate and the film of carbon nanotubes; and
wherein the carbon nanotubes are randomly directed in the film, such that the resistance can be monitored independent of direction.

12. The strain sensor of claim 11, wherein the change in the environment surrounding the film of carbon nanotubes comprises a change in a stress applied to the film of carbon nanotubes, a change in a temperature at the film of carbon nanotubes, or a change in a pressure applied to the film of carbon nanotubes.

13. The strain sensor of claim 11, further comprising:
(a) a first electrically conducting terminal positioned in a first place of the film of carbon nanotubes; and
(b) a second electrically conducting terminal positioned in a second place of the film of carbon nanotubes,
wherein the first and second electrically conducting terminals are positioned apart such that in use, an electrically conductive path is formed therebetween to detect changes in the electrical resistance of the film of carbon nanotubes in response to the change in the environment surrounding the film of carbon nanotubes.

14. The strain sensor of claim 13, wherein each of the first and second electrically conducting terminals is formed of an electrically conductive material.

15. The strain sensor of claim 11, wherein the carbon nanotubes comprise multi-wall carbon nanotubes.

16. The strain sensor of claim 15, wherein the film of multi-wall carbon nanotubes is formed to have superelasticity.

17. The strain sensor of claim 15, wherein the film of multi-wall carbon nanotubes is formed such that the electrical resistance is a function of a stress applied to the film of multi-wall carbon nanotubes.

18. The strain sensor of claim 17, wherein the electrical resistance is a linear function of the stress applied to the film of multi-wall carbon nanotubes, wherein the linear function is obtained using a 3-point bend test assembly.

19. The strain sensor of claim 15, wherein the multi-wall carbon nanotubes are formed with inner diameters in a range of about 2-8 nm, outer diameters in a range of about 10-30 nm, and lengths in a range of about 5.0-50 micros or longer.

20. The strain sensor of claim 11, wherein the carbon nanotubes are formed in a yarn such that any mechanical stress increases their electrical response.

21. The strain sensor of claim 11, wherein the carbon nanotubes are incorporated into a polymeric scaffold that is attached to the surface of the substrate.

22. The strain sensor of claim 11, wherein the surfaces of the carbon nanotubes are functionalized such that its electrical conductivity is increased.

* * * * *